United States Patent [19]

Carr

[11] Patent Number: 5,140,951
[45] Date of Patent: Aug. 25, 1992

[54] PRESSURE RELEASE THERMOSTAT

[76] Inventor: Luther J. Carr, P.O. Box 51, Hassell, N.C. 27841

[21] Appl. No.: 772,568

[22] Filed: Oct. 7, 1991

[51] Int. Cl.⁵ .............................................. F01P 1/34
[52] U.S. Cl. ............................. 123/41.15; 236/DIG. 2
[58] Field of Search ............. 123/41.15; 236/34, 34.5, 236/DIG. 2, DIG. 5; 137/68.1

[56] References Cited

U.S. PATENT DOCUMENTS 3,776,457 12/1973 Cardi ................................. 236/34.5

Primary Examiner—Noah P. Kamen
Attorney, Agent, or Firm—Hugh E. Smith

[57] ABSTRACT

An engine coolant thermostat for an internal combustion engine is provided with pressure release blowout plugs in the event that a thermostat should fail. These plugs may be formed from a fibrous material and in one embodiment, a dye is released to color the engine's coolant so as to indicate that the thermostat has failed. Further embodiments envision the use of umbrella-like strainers threadably attachable to the top of the thermostat, and these strainers may be periodically inspected to determine the type of debris and residue present in the engine's coolant.

5 Claims, 4 Drawing Sheets

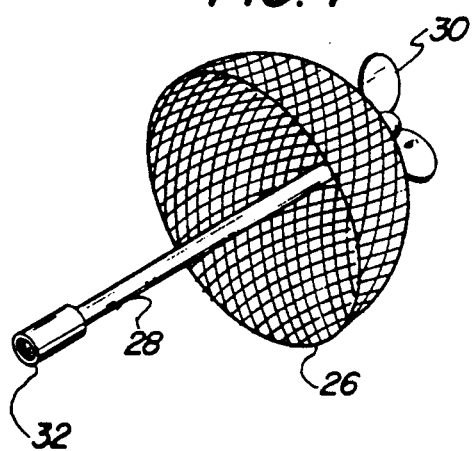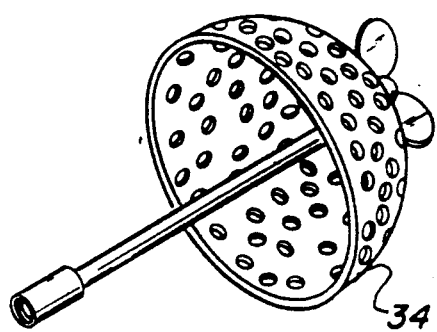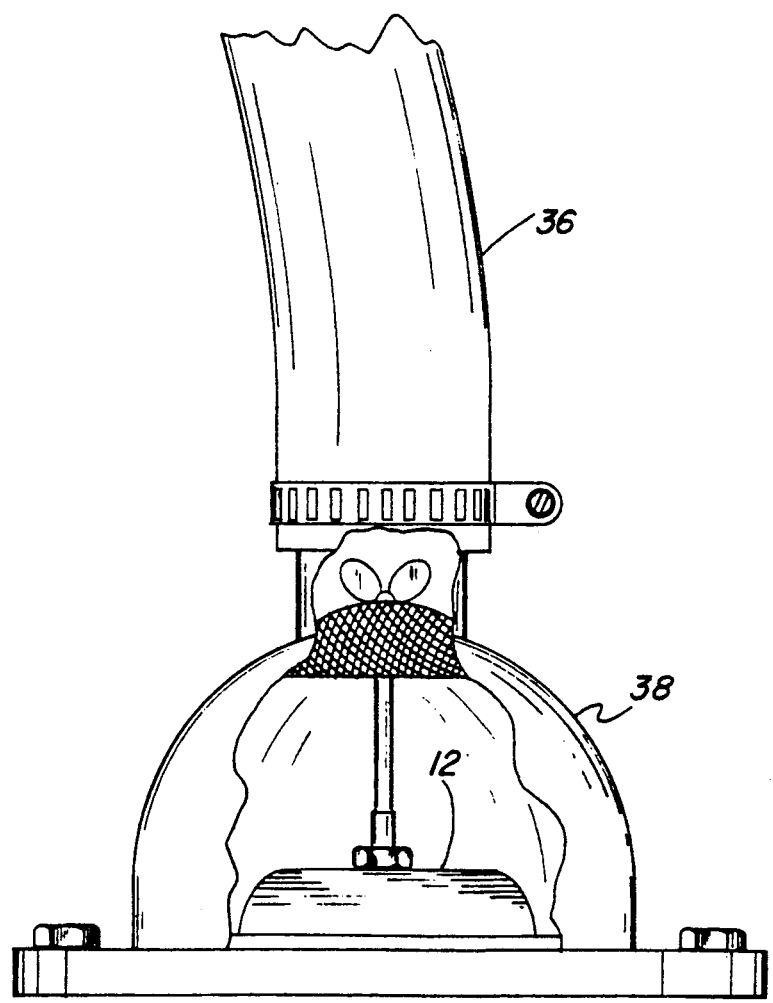

PRESSURE RELEASE THERMOSTAT

BACKGROUND OF THE INVENTION

1. Field of the Invention

The present invention relates to engine coolant thermostats and more particularly pertains to an engine coolant thermostat which is provided with a safety release means in the event of thermostat failure.

2. Description of the Prior Art

The use of safety devices in engine cooling systems is known in the prior art. For example, U.S. Pat. No. 4,691,669, which issued to Otteman et al. on Sep. 8, 1987, discloses an engine overheat protection system which indicates and signals the loss of coolant liquid as the result of a pressure drop at higher temperatures. This particular type of protection device relies upon a sophisticated electronic circuit to determine coolant and system pressure loss and to then activate the associated alarm.

A simpler type of safety protection device is to be found in U.S. Pat. No. 4,942,849, which issued to V. Shelton on Jul. 24, 1990 and which is directed to a fail-safe coolant thermostat system for an internal combustion engine. The disclosed thermostat utilizes a secondary cooling fluid passage which operates as a bypass valve means whenever the thermostat begins to fail or when engine temperature or coolant pressure exceeds a prescribed maximum. While being functional for its intended purpose, this type of thermostat is complex and expensive to manufacture and apparently, it has achieved no commercial success.

As such, there appears to exist a need for new and improved simple and economical safety devices which would detect and prevent engine damage due to thermostat failure. In this respect, the present invention substantially fulfills this need.

SUMMARY OF THE INVENTION

In view of the foregoing disadvantages inherent in the known types of engine coolant thermostats present in the prior art, the present invention provides an improved engine coolant thermostat construction wherein the same utilizes blowout plugs to release coolant pressure in the event of thermostat failure. As such, the general purpose of the present invention, which will be described subsequently in greater detail, is to provide a new and improved engine coolant thermostat which has all the advantages of the prior art engine coolant thermostats and none of the disadvantages.

To attain this, the present invention essentially comprises an engine coolant thermostat for an internal combustion engine which is provided with pressure release blowout plugs in the event that a thermostat should fail. These plugs may be formed from a fibrous material and in one embodiment, a dye is released to color the engine's coolant so as to indicate that the thermostat has failed. Further embodiments envision the use of umbrella-like strainers threadably attachable to the top of the thermostat, and these strainers may be periodically inspected to determine the type of debris and residue present in the engine's coolant.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved engine coolant thermostat which has all the advantages of the prior art engine coolant thermostats and none of the disadvantages.

It is another object of the present invention to provide a new and improved engine coolant thermostat which may be easily and efficiently manufactured and marketed.

It is a further object of the present invention to provide a new and improved engine coolant thermostat which is of a durable and reliable construction.

An even further object of the present invention is to provide a new and improved engine coolant thermostat which is susceptible of a low cost of manufacture with regard to both materials and labor, and which accordingly is then susceptible of low prices of sale to the consuming public, thereby making such engine coolant thermostats economically available to the buying public.

Still yet another object of the present invention is to provide a new and improved engine coolant thermostat which provides in the apparatuses and methods of the prior art some of the advantages thereof, while simultaneously overcoming some of the disadvantages normally associated therewith.

Still another object of the present invention is to provide a new and improved engine coolant thermostat which utilizes blowout plugs to release engine coolant pressure in the event of thermostat failure.

Yet another object of the present invention is to provide a new and improved engine coolant thermostat which releases a coloring dye into the engine coolant system in the event of thermostat failure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a perspective view of an umbrella-like filter screen utilizable with both embodiments of the invention.

FIG. 8 is a perspective view of a modified form of umbrella-like filtering screen.

FIG. 9 is a partial cross-section of a thermostat housing illustrating a use of the umbrella-like filter screens shown in FIG. 7 and 8.

DESCRIPTION OF THE PREFERRED EMBODIMENT

Figure 1:
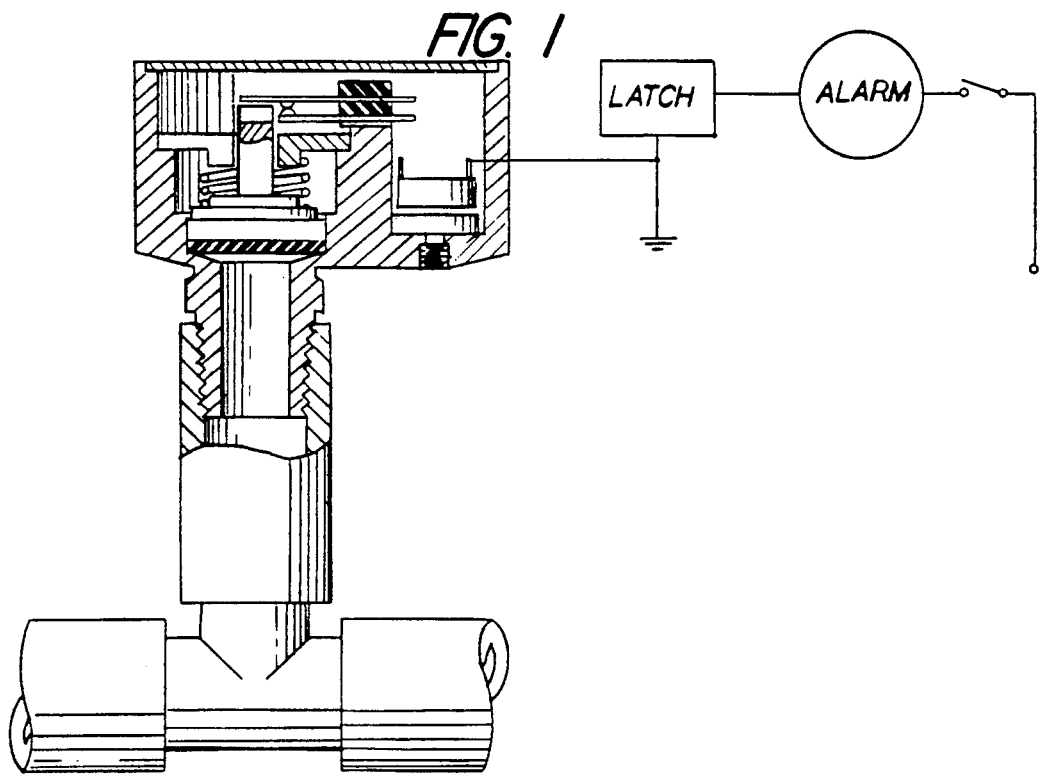
FIG. 1 is a side elevation view of a prior art engine overheat protection system.

With reference now to the drawings, a first embodiment of a new and improved pressure release thermostat embodying the principles and concepts of the present invention and generally designated by the reference numeral 10 will be described.

Figure 2:
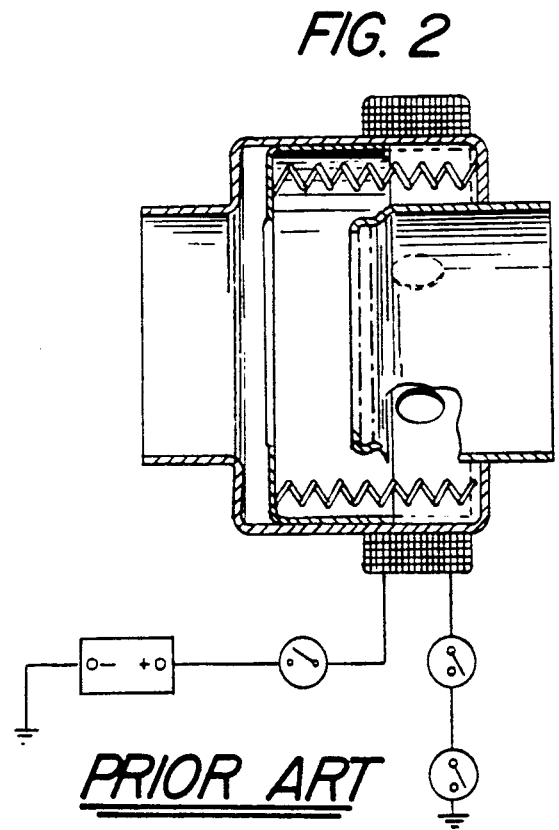
FIG. 2 is a cross-sectional view of a prior art fail-safe engine coolant thermostat.

Initially however, reference is made to FIGS. 1 and 2 of the drawings wherein prior art safety devices associated with engine coolant systems are illustrated. Both of these devices have been priorly discussed, and these figures are provided for the purpose of more clearly illustrating the state of the prior art. FIG. 1 relates to U.S. Pat. No. 4,691,669, as above-discussed, and FIG. 2 relates to U.S. Pat. No. 4,942,849, as also above-discussed. These figures are illustrative of the complexity of the prior art and the apparent problems associated with attempting to economically manufacture such devices. The present invention substantially overcomes these problems.

Figure 3:
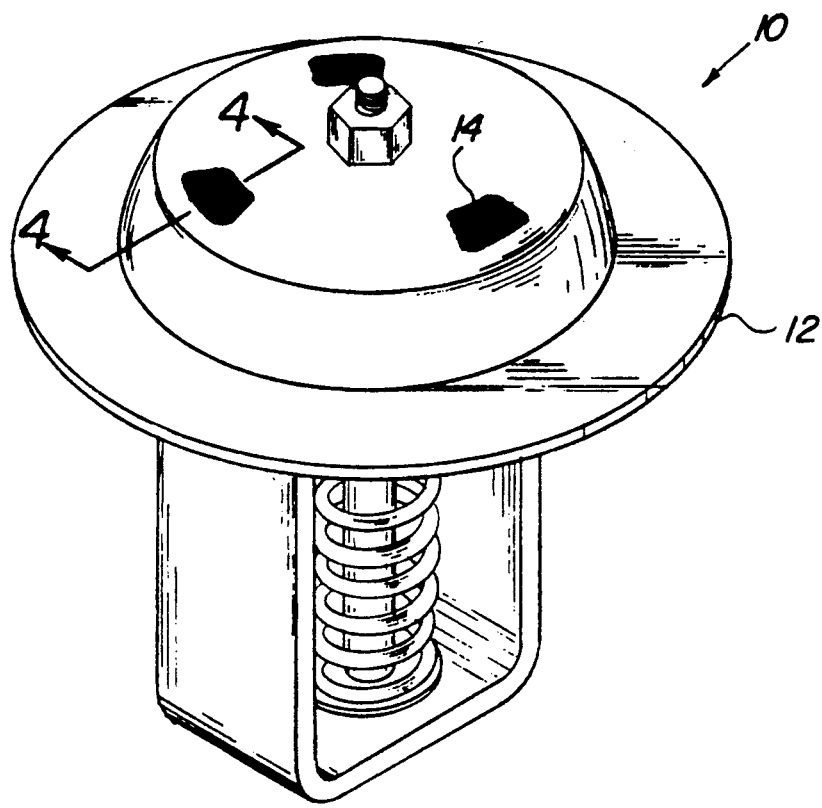
FIG. 3 is a perspective view of a first embodiment of the present invention.
Figure 4:
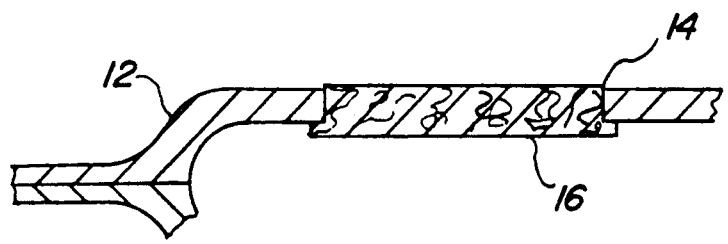
FIG. 4 is a partial cross-sectional view of the invention as viewed along the line 4—4 in FIG. 3.

With respect to the first embodiment 10 of the invention as illustrated in FIGS. 3 and 4, it can be seen that a conventional thermostat 12 may be modified to have a plurality of through-extending, trapezoidally-shaped apertures 14 into which a plurality of fiber rupture disks 16 may be adhesively or frictionally fitted.

In use, these fiber disks are designed to possess sufficient strength to prevent their rupture during normal vehicle engine operation. However, in the event that the thermostat 12 should stick in a closed position, the engine coolant would experience a substantial rise in heat and pressure whereby the fiber disk 16 would rupture to allow the engine coolant to again flow through the system. Where a plurality of these disks 16 are utilized in a thermostat 12, each disk could vary in rupture strength characteristics from the other disks whereby a serial rupturing of the disks would occur as engine pressure and temperature increases. This would prevent an immediate decrease in temperature as indicated on an engine compartment gauge, whereby engine coolant temperature would remain high enough to indicate a thermostat failure to the vehicle operator. As can be appreciated, if the engine coolant temperature and resultant pressure continues to rise, additional disks 16 would rupture to further lessen the likelihood of substantial engine damage while still providing the vehicle operator with some indication of thermostat failure.

Figure 5:
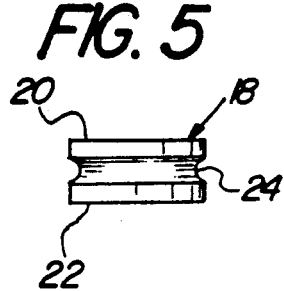
FIG. 5 is a side elevation view of a dye releasing blowout plug utilizable with a second embodiment of the invention.
Figure 6:
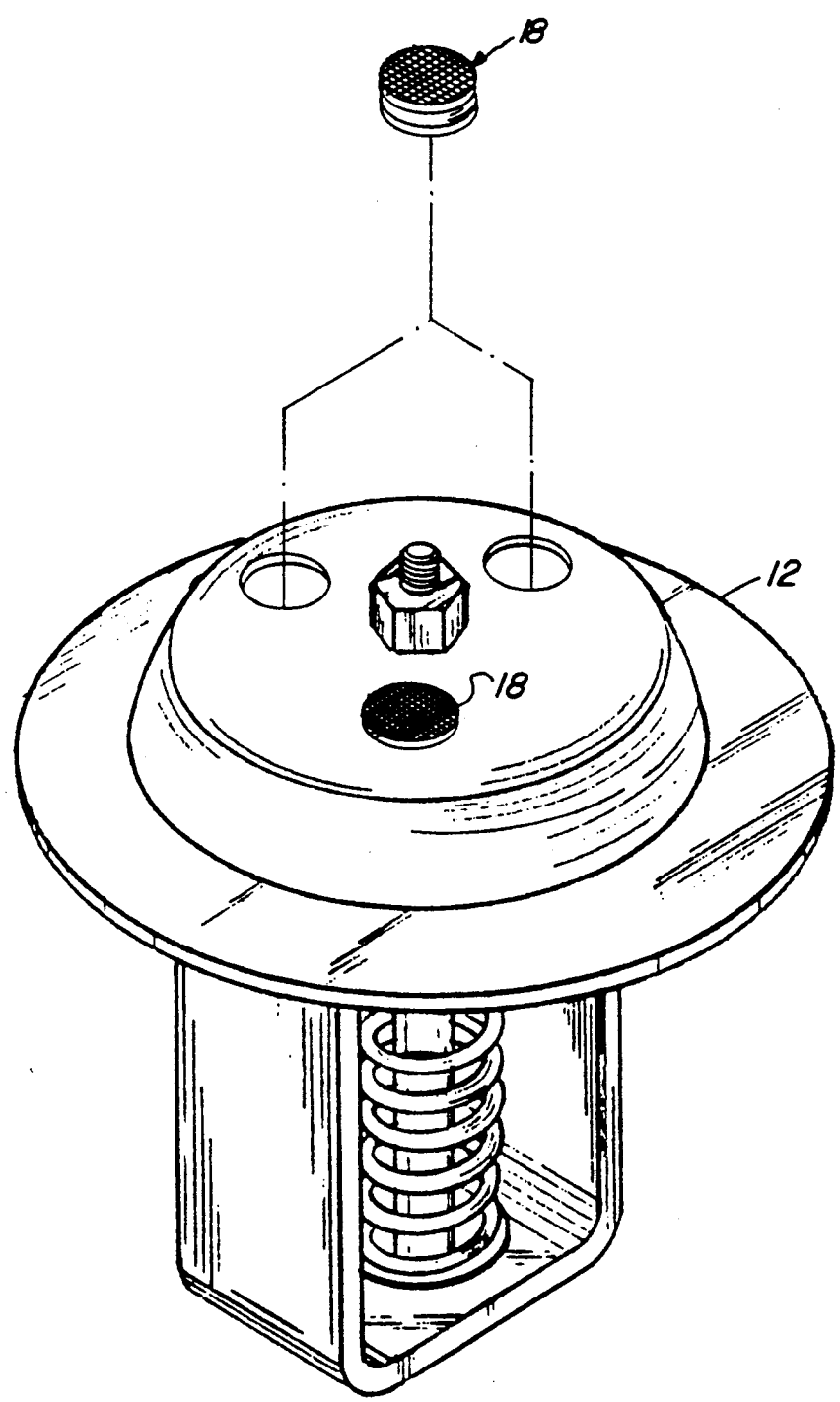
FIG. 6 is a perspective view of the second embodiment of the invention.

FIGS. 5 and 6 illustrate a modified embodiment of the invention wherein a plug 18 is formed with top and bottom fiber mats 20, 22 respectively, and sandwiched between the mats is a layer of solid coloring dye 24. The dye 24 would be designed to dissolve in the event of an unacceptable engine coolant temperature, thereby facilitating the release and rupture of the associated disk 20, 22. In this situation, where a vehicle operator is not sure that an engine thermostat failure has occurred (perhaps due to only a slightly higher temperature indication on a temperature gauge), the operator can inspect the coolant to determine if a color change has occurred. If such a color change has occurred, an indication of unacceptable engine coolant temperature is provided, as well as thermostat failure.

Under certain circumstances, it may be desirable to inspect the engine coolant to determine the type of large particles and other residue flowing therethrough. Normally, solid residue will gravitate to the bottom of the radiator once the engine has ceased running, and it becomes difficult to determine if large particles of residue are actually flowing through the coolant. FIGS. 7, 8 and 9 illustrate a use of an umbrella-like particle capturing screen in combination with the thermostat 12. In this regard, FIG. 7 shows an umbrella-like shaped filtering screen 26 which is positioned over a threaded rod 28 and retained in such position by a wing nut 30. A remaining free end of the rod 28 is provided with a coupling 32 which is directly attachable by some conventional means to the top of a thermostat 12 as best illustrated in FIG. 9. In operation, the screen 26 tends to capture large residue and other particles from the flowing stream of coolant as above explained. Where only large particles are desired to be captured, a perforated cup member 34 may be used to replace the cup-like screen member 26. Through the simple removal of a coolant hose 36, an engine operator can peer into the thermostat housing 38 to determine the extent of debris collection in either a screen 26 or perforated cup 34.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved engine coolant thermostat assembly comprising:
    an engine thermostat having at least one through-extending aperture cut out in a top cap portion thereof; and
    at least one blowout plug positioned in said through-extending aperture, said blowout plug being designed to be released from said aperture in the event that said engine coolant reaches an unacceptable pressure, said blowout plug being formed of a fiber material to facilitate its rupture in the event of its release from said aperture.

2. The new and improved engine coolant thermostat as described in claim 1, and further wherein said blowout plug is provided with a coloring dye for indicating unacceptable engine coolant temperature and pressure.

3. The new and improved engine coolant thermostat as described in claim 1, and further including a residue and particle collector attachable to said thermostat.

4. The new and improved engine coolant thermostat as described in claim 3, wherein said residue and particle catcher utilizes a cup-like screen filter.

5. The new and improved engine coolant thermostat as described in claim 3, wherein said residue and particle catcher utilizes a cup-like perforated plate.

* * * * *